United States Patent
Giel et al.

[11] Patent Number: 5,881,377
[45] Date of Patent: Mar. 9, 1999

[54] COMMUNICATION DEVICE AND DISPLAY BLANKING CONTROL METHOD THEREFOR

[75] Inventors: James Giel; Gary A. Welsch, both of Palatine, Ill.

[73] Assignee: Motorola, Inc., Schaumburg, Ill.

[21] Appl. No.: 697,747

[22] Filed: Aug. 29, 1996

[51] Int. Cl.$^6$ .............................. H04B 1/16; H04B 1/40; H04M 11/00

[52] U.S. Cl. ................... 455/343; 455/38.3; 455/574

[58] Field of Search ........................... 455/343, 38.3, 455/566, 574

[56] References Cited

U.S. PATENT DOCUMENTS

| D. 305,427 | 1/1990 | Soren et al. | D14/138 |
|---|---|---|---|
| 3,109,893 | 11/1963 | Burns | 379/252 |
| 5,010,566 | 4/1991 | Seo | 455/566 |
| 5,175,759 | 12/1992 | Metroka | 455/556 |
| 5,204,986 | 4/1993 | Ito et al. | 455/343 |
| 5,222,076 | 6/1993 | Ng et al. | 375/9 |
| 5,224,151 | 6/1993 | Bowen | 455/569 |
| 5,394,166 | 2/1995 | Shimada | 345/98 |
| 5,446,759 | 8/1995 | Campana, Jr. | 375/267 |
| 5,463,380 | 10/1995 | Matai | 455/343 |
| 5,548,832 | 8/1996 | Karam | 455/38.3 |
| 5,586,182 | 12/1996 | Miyashita | 455/566 |
| 5,594,951 | 1/1997 | Bellin | 455/343 |
| 5,606,740 | 2/1997 | Niratsuka | 455/343 |

OTHER PUBLICATIONS

Motorola Cordless Telephone Owner's Manual, pp. 16–17, 1994.

*Primary Examiner*—Howard Britton
*Attorney, Agent, or Firm*—John G. Rauch

[57] ABSTRACT

A method and apparatus control blanking of a display (106) in a communication device (100) such as a battery powered radiotelephone. The communication device (100) includes a clock operated blanking timer 317. When the blanking timer 317 elapses, the communication device (100) blanks the display (106) a predetermined time after a key press of a keypad (108). A switch (310) detects when the communication device (100) is in use. In response to this detection, the communication device (100) maintains supply of operating power to the display (106), overriding the blanking timer 317. When a user is holding the communication device (100) adjacent to the user's head, an earpiece sensor (312) provides an indication of this condition. In response to the indication, the display (106) is immediately blanked to conserve operating power in the battery (124).

24 Claims, 4 Drawing Sheets

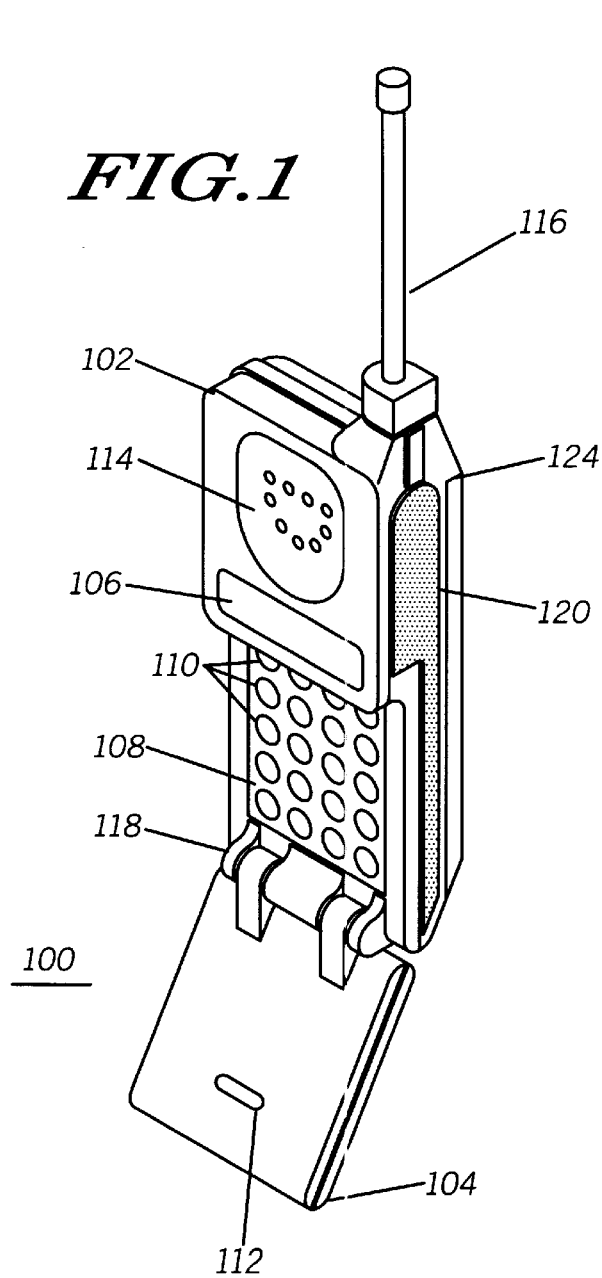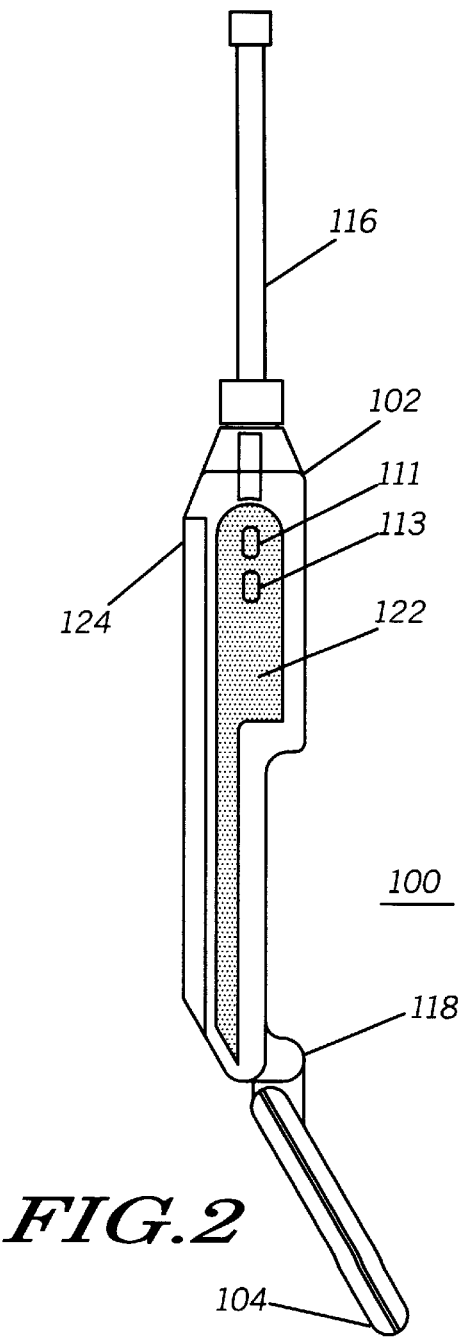

COMMUNICATION DEVICE AND DISPLAY BLANKING CONTROL METHOD THEREFOR

FIELD OF THE INVENTION

The present invention relates generally to communication devices. The present invention relates more particularly to conservation of battery power in battery operated portable communication devices.

BACKGROUND OF THE INVENTION

Many communication devices are mobile and operate on battery power. Such communication devices generally include a radio receiver and/or radio transmitter for radio communication, a user interface for controlling the communication device, and a rechargeable battery for powering the communication device.

An example of such a communication device is a radiotelephone. A radiotelephone includes a receiver and transmitter and operates in a radiotelephone system. The radiotelephone system includes one or more base stations coupled to the public switched telephone network (PSTN) and configured for completing calls between the radiotelephone and the PSTN. The radiotelephone, or mobile station, is portable and therefore free to move about within a fixed geographic area served by the base station. To improve mobility and user convenience, many radiotelephones are powered by rechargeable batteries. Other examples of such communication devices are paging receivers and land mobile radios.

One design goal for communication devices including radiotelephones is minimization of power consumption from the battery. One reason for this goal is to permit the use of physically smaller, lighter batteries. Such smaller and lighter batteries permit the communication device itself to be physically smaller and lighter, and thereby more convenient for the user. A second reason for minimizing power consumption in a communication device is to extend the operating time of the communication device, which also enhances convenience for the user.

Displays in communication devices are one source of substantial power consumption. Such displays include multi-segment light emitting diode (LED) displays and liquid crystal (LCD) displays. LCD and other displays often include backlighting using one or more LEDs to improve night time visibility of the display. In addition, the display may include individual elements such as LEDs which are selectively energized to provide a user indication. Still further, many communication devices having keypads provide one or more LEDs for backlighting the keypad for visibility in the dark.

One known method of reducing power consumption in a communication device is blanking the display a predetermined time after operation of the keypad. The display is blanked by removing power from portions of the display. Such portions include specific LED segments or LEDs used for backlighting a LCD display. Only one or a few isolated illuminated elements, such as LED indicators, remain energized to provide a visual indication that the communication device is active. By blanking the display, power consumption can be substantially reduced.

The rationale for blanking the display is that there are times when a user no longer needs to see the display. For example, once a user has initiated a telephone call, the user no longer needs to see the display. Also, when the user is not actively using the telephone and the user is awaiting an incoming call, the user does not need to see the display. The display is necessary when entering numbers using the keypad, for verifying accurate entry. The display is also necessary when operating other features of the user interface of the radiotelephone, such as recalling telephone numbers stored in the radiotelephone's memory. Once the call is connected and the user holds the radiotelephone against the user's head during the conversation, the display is not needed by the user and blanking is appropriate. The radiotelephone blanks the display after a preset time delay (such as 8 seconds) following the last keypress or following the opening of a keypad cover. This rationale applies to other types of communication devices as well.

In some instances, blanking can hinder user convenience. This can occur if the user is still holding the communication device in his hand and still wants to see the information on the display. Blanking at such a time is inconvenient for the user. According to current designs, in order to get the information on the display to reappear, the user must press a key on the keypad or close and open the keypad cover. Either action may produce undesired responses, such as changing the state of the communication device or ending an active call. There are other instances when display blanking can hinder user convenience. One of these is while trying to operate the communication device while driving, at times when the user's constant concentration on driving is required for more than 8 seconds. Another example is when using the communication device in the dark, when having keypad backlighting turned off makes it difficult to find keys including a key which will illuminate the display.

Accordingly, there is a need in the art for a method and apparatus for controlling the blanking in a communication device.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

FIG. 1 is a first view of a communication device;

FIG. 2 is a second view of the communication device of FIG. 1;

DETAILED DESCRIPTION OF A PREFERRED EMBODIMENT

Figure 3:
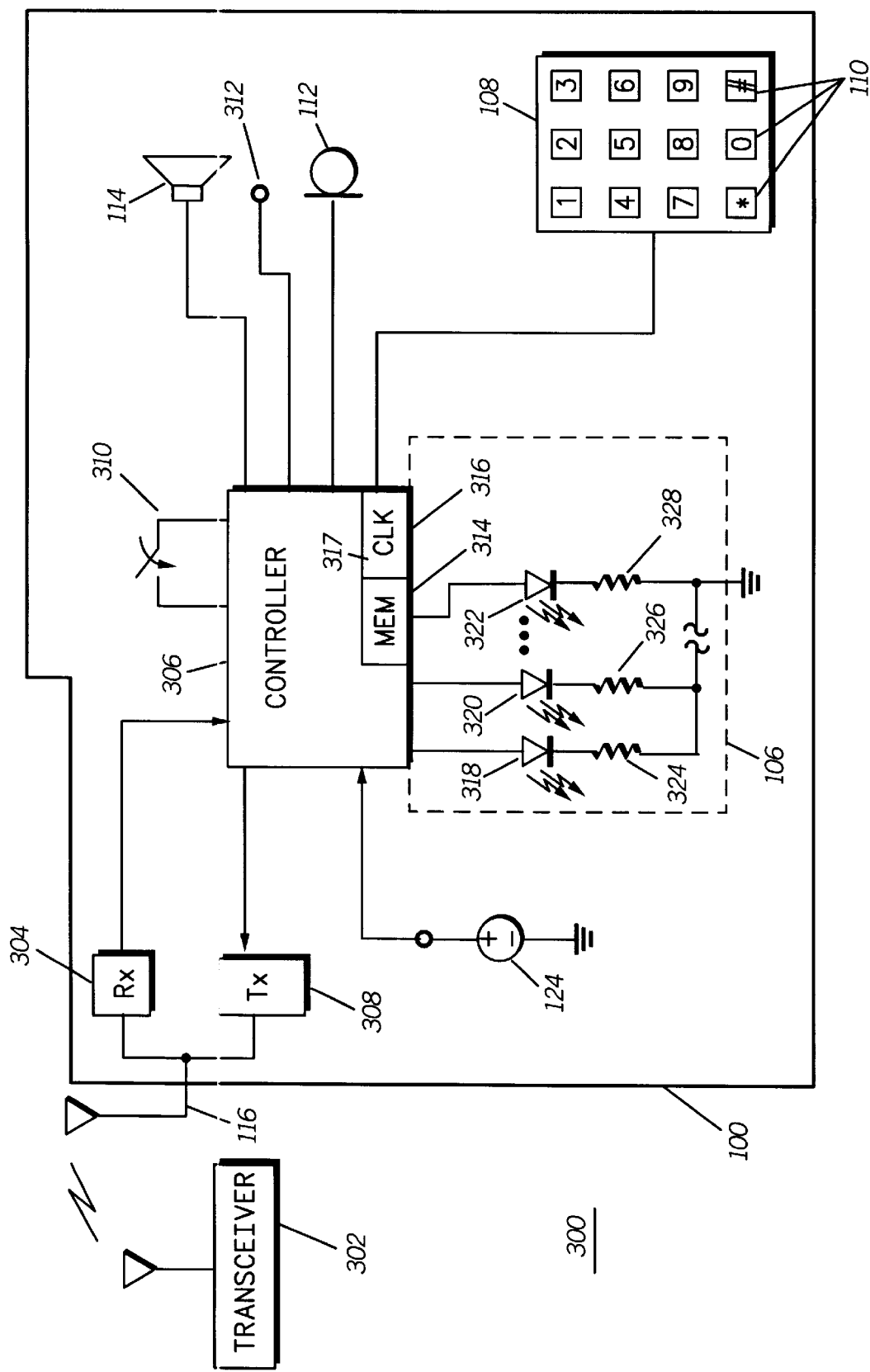
FIG. 3 is an operational block diagram of a radio communication system including the communication device of FIG. 1.

Referring now to FIG. 1 and FIG. 2, they show a communication device 100. The communication device 100 comprises a battery operated radiotelephone, specifically a cellular telephone. However, the advantages of the present invention may be realized when used in conjunction with other types of communication devices, such as cordless telephone handsets, paging receivers and land mobile radio handsets or other data terminal.

The communication device 100 includes a housing 102 and a keypad cover 104. The communication device 100 further includes a display 106 disposed within the housing 102, a keypad 108 disposed within the housing 102, the keypad 108 including a plurality of keys 110. Volume keys 111, 113 are disposed on the side of the housing 102 for adjusting the volume of the communication device 100. The communication device 100 further includes a microphone 112, an earpiece 114, and a retractable antenna 116. The display 106, the keypad 108, the volume keys 111, 113, the microphone 112 and the earpiece 114 form a user interface for operation of the communication device.

The keypad cover 104 is moveable between an open position, illustrated in FIGS. 1 and 2, and a closed position in which the keypad cover 104 rotates about a hinge 118 to cover the keypad 108. When the keypad cover 104 is opened, the radiotelephone is switched from a standby or off condition to an on condition, the display is illuminated and the communication device 100 awaits actuation of the keypad 108. When the keypad cover 104 is closed, if the communication device 100 was in an active call, the radio connection is interrupted and the communication device 100 is switched from the on state to a standby or off state. A communication device in accordance with an alternative embodiment of the present invention omits the keypad cover 104 without diminishing the advantages provided by the invention, with the functionality provided by the keypad cover 104 being instead provided by keys 110 of the keypad 108.

A battery 124 is configured for attachment to the housing 102. The battery 124 is removable and is preferably rechargeable. The battery provides operating power for the communication device 100. Operating power could alternatively be provided by one or more cells, such as standard "AA" or "AAA" cells, located within a battery compartment of the housing 102.

One or more grips, including grip 120 and grip 122, are disposed on the housing 102. The grips 120, 122 are configured for manual grasping by a user during operation of the communication device 100. In one typical application, it is envisioned that the communication device 100 will be held by the user in one hand with the display 106 and keypad 108 generally facing toward the user. In this application, the fingers of the user's other hand operate the keys 110 of the keypad 108 for dialing, for displaying information on the display 106, for scrolling through telephone numbers stored in the communication device 100, selecting a number, initiating a call, and for performing other functions. In another application, during a conversation, it is envisioned that the communication device 100 will be located adjacent to the user's head, with the earpiece 114 near the user's ear and the microphone 112 near the user's mouth. In both of these applications, it is envisioned that the user will grasp the grips 120, 122 between the user's fingers, applying pressure to the grips to maintain a secure hold of the communication device.

The grips 120, 122 are made of rubber or other flexible material or are molded portions of the housing 102. The grips 120, 122 preferably have a raised surface to enhance the user's grasp on the communication device 100.

In accordance with the present invention, the communication device 100 further includes a switch responsive to grasping of the one or more grips 120, 122 and an earpiece sensor for providing an indication when the communication device is located adjacent to the user's head. Operation of these additional elements will be discussed further below.

FIG. 3 is an operational block diagram of a radio communication system 300 including the communication device 100 of FIG. 1. The radio communication system 300 includes a remote transceiver 302 and one or more communication devices such as communication device 100. The remote transceiver 302 sends and receives radio frequency (RF) signals to and from communication devices within a fixed geographic area. The RF signals include digital data transmitted serially and modulated by a carrier frequency. The communication device 100 is one such communication device contained within the geographic area. The radio communication system 300 is a cellular telephone system, a cordless telephone system, a paging system, a land mobile radio system or any other suitable radio system.

In addition to the elements described above in conjunction with FIGS. 1 and 2, the communication device 100 includes a receiver 304, a controller 306, a transmitter 308, a switch 310 and an earpiece sensor 312. Upon reception of RF signals, the communication device 100 receives the RF signals through the antenna 116. The antenna 116 converts the received RF signals into electrical baseband signals. The receiver 304 recovers the data transmitted on the RF signals and provides the data to the controller 306. The controller 306 formats the data into recognizable voice or information for use by the user interface, including the display 106, the keypad 108, the earpiece 114 and the microphone 112. The user interface communicates the received information or voice to a user.

Upon transmission of radio frequency signals from the communication device 100 to the remote transceiver 302, the user interface transmits user input data to the controller 306. The controller 306 formats the information obtained from the user interface and transmits it to the transmitter 308 for conversion into RF modulated signals. The transmitter 308 conveys the RF modulated signals to the antenna 116 for transmission to the remote transceiver 302.

The controller 306 includes a memory 314 and a clock 316. The controller comprises a microprocessor or microcontroller such as the 68HC11 microcontroller, manufactured by Motorola, Inc., Schaumburg, Ill. The controller 306 operates in response to instructions and data stored in the memory 314. The controller 306 uses the clock 316 for establishing a time base and timing events and elapsed times.

The display 106 includes one or more light emitting diodes (LEDs), such as LED 318, LED 320 and LED 322. Each LED has an associated current limiting resistor, including resistor 324, resistor 326 and resistor 328. Each LED is illuminated by the controller 306 applying an appropriate signal to the LED. The controller 306 illuminates respective LEDs in response to the operating condition of the communication device 100. For example, if a user is manipulating the keypad 108 to enter a telephone number, the controller 306 illuminates predetermined ones of the LEDs to provide an alpha-numeric display of the telephone number. The controller 306 further illuminates other ones of the LEDs to illuminate the keypad 108. The controller still further illuminates other ones of the LEDs to provide a visual indication of operational status, such as "in use" or "low battery" or a received signal strength indication. If the display 106 includes a back-lit liquid crystal display, the controller illuminates at least one LED to illuminate the liquid crystal display.

The keypad 108 includes a standard 12 key telephone-type keypad, as is illustrated in FIG. 3. The keypad also includes other keys which provide other functions, such as "send" and "receive," and menu control functions such as "store," "recall" and "clear." The controller 306 detects key presses of the keys 110 and controls operation of the communication device 100 accordingly.

The earpiece sensor 312 provides an indication when the communication device 100 is located adjacent to a user's head. Any suitable sensor is used to detect proximity to the user's head, such as a heat-sensitive switch or proximity detector or optoelectronic switch. The earpiece sensor 312 is coupled to the controller 306 for providing the indication to the controller 306.

The switch 310 is responsive to grasping of the one or more grips 120, 122 (FIGS. 1–2) for providing a blanking control signal. If the grips 120, 122 are of the type which flex when grasped by a user's hand, the switch 310 is disposed beneath one or both of the grips so that the switch mechanism closes the switch contacts in response to the pressure of the user's grasp. Alternatively, the switch 310 is any type of switch which selectively provides a switch actuation when the usere holds or grasps the communication device. It will be recognized by those ordinarily skilled in the art that other devices may be substituted for the switch 310 to provide the blanking control signal.

The blanking control signal provides an indication that the user is grasping the communication device 100 to operate the communication device 100. Preferably, the switch 310 closes when the user holds the communication device in one hand while operating the keypad 108. Further, preferably, the switch 310 remains closed when the user grasps the communication device 100 and holds the communication device 100 adjacent to the user's head. Thus, the switch 310 is closeable in response to operation of the communication device 100. The controller 306 is coupled to the switch 310 to detect the blanking control signal.

In accordance with the present invention, the controller 306 is responsive to closure of the switch 310 for controlling supply of operating power from the battery 124 to the display 106. The controller 306 operates the clock 316 as a blanking timer 317. The controller 306 interrupts supply of operating power to portions of the display 106 following a predetermined time, such as 8 seconds, timed by the blanking timer 317. The blanking timer 317 starts timing in response to a press of one key of the plurality of keys 110 forming the keypad 108. If the communication device 100 includes a keypad cover such as keypad cover 104, the blanking timer 317 also starts timing in response to opening of the keypad cover.

The controller 306 interrupts supply of operating power to all or only a part of the display 106. For example, LEDs used for backlighting the keypad 108 and a liquid crystal display are blanked and one LED left illuminated to provide an indication that the communication device 100 is active.

Further in accordance with the present invention, the controller 306 maintains supply of operating power to the display in response to the blanking control signal received from the switch 310. The switch 310 provides the blanking control signal in response to operation of the communication device 100, such as grasping the grips 120, 122 by the user. Thus, if the user is grasping the communication device 100 to manipulate the keypad, the controller 306 maintains supply of operating power to the display 106, inhibiting blanking of the display 106. In this manner, the display remains illuminated while the user is dialing, retrieving a number from memory 314, etc., even if the user waits more than the predetermined time (8 seconds or some other suitable time) between key presses. While inhibiting blanking depletes the battery 124 slightly more rapidly, by keeping the display 106 illuminated, the communication device according to the present invention enhances user convenience by accommodating the particular user's needs without blanking the display and possibly losing displayed information.

Because the switch 310 is closed whenever the user grasps the communication device 100, the switch 310 is also closed when the user holds the communication device 100 adjacent to the user's head. Thus, the display remains illuminated as the controller 306 maintains supply of operating power to the display 106. However, during the time when the communication device 100 is placed in an operating configuration, such as adjacent to the user's head, illumination of the display 106 is unnecessary and blanking the display advantageously conserves battery power. Other suitable operating configurations where illumination is unnecessary include a desk top, hands free mode, use in conjunction with a detachable headset, or similar.

Therefore, in accordance with the present invention, the controller 306 receives from the earpiece sensor 312 an indication that the communication device 100 is located adjacent to the user's head. The controller 306 responds to the indication by interrupting supply of operating power to the display 106. Thus, when the user completes dialing of the communication device 100 and raises the communication device 100 to the user's head, the display 106 is blanked, thereby conserving operating power in the battery 124. If the user removes the communication device 100 from adjacent to the user's head, for example to check the display, the earpiece sensor 312 no longer provides the indication and, because the switch 310 remains closed, the controller 306 returns supply of operating power to the display 106. The earpiece sensor 312 further facilitates extension of battery life since it allows activation of the low power display blanking immediately, rather than having to wait the predetermined time (e.g., 8 seconds) each time after the last key press.

Figure 4:
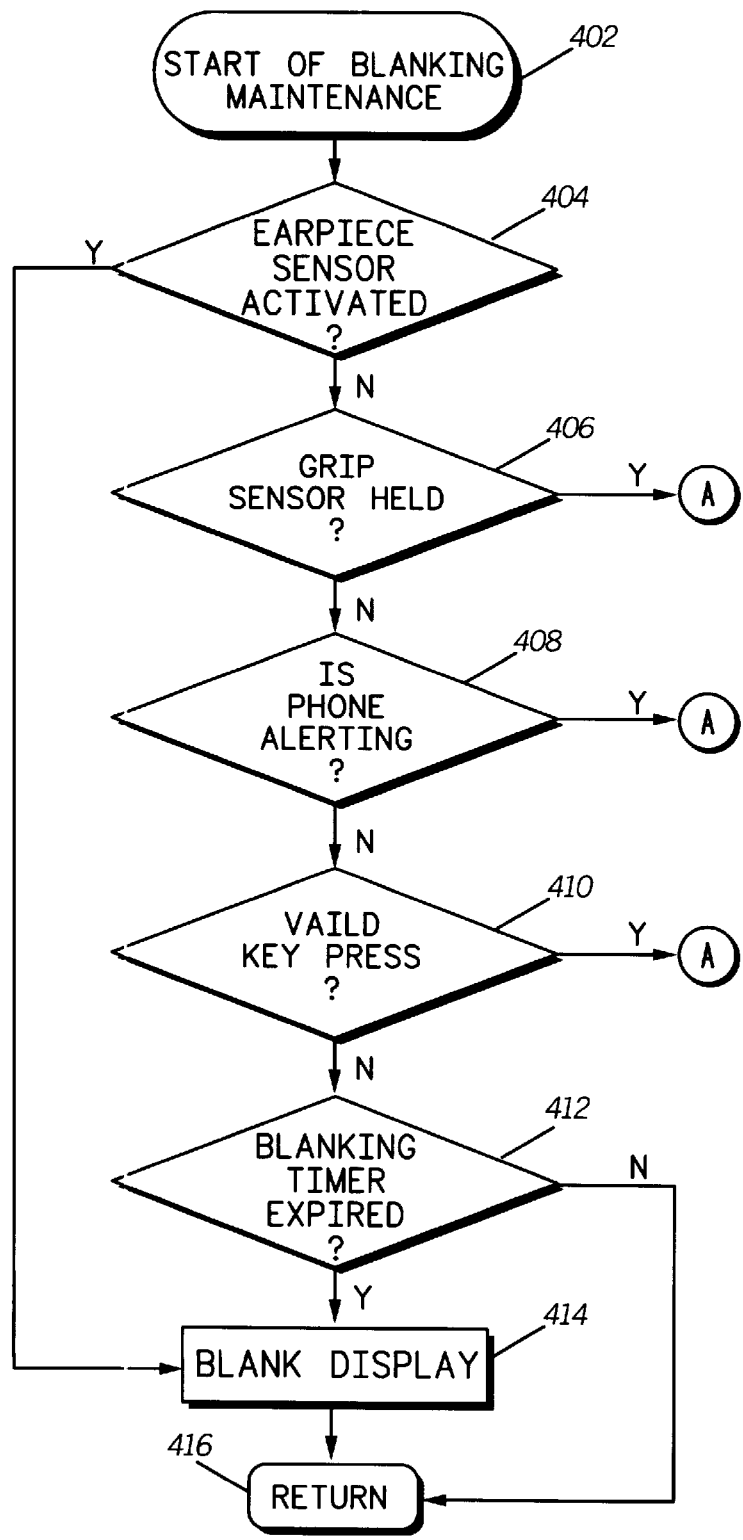
FIG. 4 is a first flow diagram illustrating operation of the communication device of FIG. 1 according to the present invention.

FIG. 4 is a first flow diagram illustrating operation of the communication device 100 of FIGS. 1–3 according to the present invention. FIG. 4 shows a portion of a blanking maintenance routine performed by the controller 306 (FIG. 3). This routine is preferably performed periodically, such as every 30 milliseconds. FIG. 4 shows a method for limiting battery power dissipation in a battery operated radiotelephone, such as communication device 100. The method begins at step 402.

At step 404, the controller 306 determines if the earpiece sensor 312 is activated and providing the indication that the communication device 100 is located adjacent to the user's head. If so, execution proceeds to step 414 where the display 106 is blanked. The indication that the communication device 100 is located adjacent to the user's head indicates that the display 106 is unnecessary and that battery life is extended by blanking the display. The blanking maintenance routine then ends at step 416. If at step 404, the earpiece sensor is not activated, execution continues at step 406.

Figure 5:
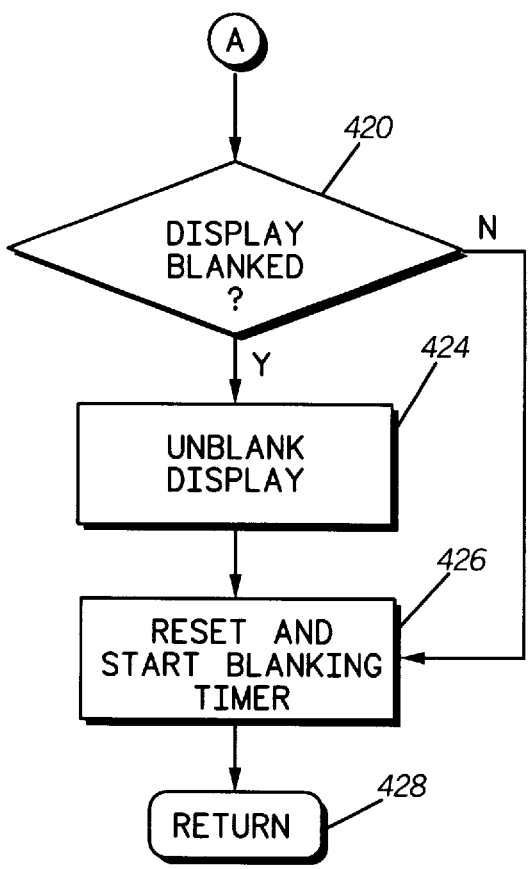
FIG. 5 is a second flow diagram illustrating operation of the communication device of FIG. 1 according to the present invention.

At step 406, the controller 306 determines if the grips 120, 122 are grasped by the user. This is determined by examining the state of the switch 310. If the switch 310 is closed and providing the blanking control signal, the controller determines that one or both of the grips 120, 122 are still held and control proceeds to step 420 (FIG. 5). If the grips 120, 122 are not grasped, as indicated by the switch 310, control continues at step 408.

At step 408, the controller 306 determines if the communication device 100 is alerting. The communication device

100 alerts to indicate an incoming call or page. The alert takes the form of an audible tone such as an electronic ringing tone, vibration or other silent alert. If the communication device 100 is alerting, control proceeds to step 420. If not, execution continues at step 410.

At step 410, the controller determines if a valid key press has been received at the keypad 108. If so, the display should be illuminated and execution continues at step 420 (FIG. 5) for un-blanking the display. If no valid key press has been received, execution continues at step 412.

At step 412, the controller 306 determines if the blanking timer 317 has expired. If not, the routine ends at step 416. If the blanking timer 317 has expired, at step 414, the display 106 is blanked. Thus, the display 106 is blanked only if the earpiece sensor is activated or after testing blanking conditions such as grip sensor status and the blanking timer condition.

FIG. 5 is a second flow diagram illustrating further operation of the communication device 100 of FIGS. 1–3 in accordance with the present invention. FIG. 5 shows a further portion of a blanking maintenance routine performed by the controller 306 (FIG. 3).

At step 420, the controller determines if the display 106 has been previously blanked to control supply of operating power from the battery 124 to the display 106. If the display 106 has not been blanked, execution continues at step 426. If the display has been blanked, at step 424 the display is un-blanked. Referring to FIG. 3, the controller 306 illuminates all LEDs appropriate for the current operating mode of the communication device 100. At step 426, the controller 306 resets the blanking timer 317 and starts the blanking timer 317. The routine ends at step 428.

As can be seen from the foregoing, the present invention provides a method and apparatus for controlling display blanking in a communication device such as a battery powered radiotelephone. The communication device includes a blanking timer which blanks the display a predetermined time after a key press. A switch detects when the communication device is in use. In response to this detection, the communication device maintains supply of operating power to the display, overriding the blanking timer. When a user is holding the communication device adjacent to the user's head, an earpiece sensor provides an indication of this condition. In response to the indication, the display is immediately blanked to conserve operating power in the battery.

While a particular embodiment of the present invention has been shown and described, modifications may be made. For example, the invention may be applied to any type of battery powered communication device. Also, any type of suitable sensors may be used, located in any appropriate place on the communication device, to detect if the user is grasping the communication device and if the communication device is located in an operation position, such as adjacent to the user's head. Still further, while the earpiece sensor is described herein as being associated with and located at the earpiece, the sensor may be located in any suitable location of the communication device. It is therefore intended in the appended claims to cover all such changes and modifications which fall within the true spirit and scope of the invention.

What is claimed is:

1. A communication device comprising:
   a battery for supplying operating power;
   a display;
   a switch closeable in response to grasping of the communication device by a user; and
   a controller coupled to the switch, the battery and the display, the controller responsive to closure of the switch for controlling supply of operating power from the battery to the display, the controller maintaining supply of operating power from the battery to the display in response to closure of the switch.

2. A communication device as recited in claim 1 further comprising an earpiece sensor coupled to the controller for providing an indication when the communication device is located adjacent to a user's head, the controller responsive to the indication for interrupting supply of operating power from the battery to the display.

3. A communication device as recited in claim 1 wherein the display comprises one or more light emitting diodes.

4. A communication device as recited in claim 3 wherein the display further comprises a back-lit liquid crystal display.

5. A communication device as recited in claim 3 wherein the communication device comprises a keypad and wherein the display further comprises one or more light emitting diodes for illuminating the keypad.

6. A battery operated radiotelephone comprising:
   a housing;
   a display disposed within the housing;
   one or more grips disposed on the housing and configured for grasping by a user;
   a switch responsive to grasping of the one or more grips for providing a blanking control signal; and
   a controller disposed within the housing, the controller interrupting supply of operating power to the display following a predetermined time, the controller maintaining supply of operating power to the display in response to the blanking control signal.

7. A battery operated radiotelephone as recited in claim 6 wherein the controller comprises a blanking timer for timing the predetermined time.

8. A battery operated radiotelephone as recited in claim 7 wherein the battery operated radiotelephone further comprises a keypad including a plurality of keys, the blanking timer starting timing in response to a press of one key of the plurality of keys.

9. A battery operated radiotelephone as recited in claim 6 wherein the battery operated radiotelephone further comprises an earpiece sensor coupled to the controller for providing an indication when the battery operated radiotelephone is located adjacent to a user's head, and wherein the controller responds to the indication by interrupting supply of operating power to the display.

10. A battery operated radiotelephone as recited in claim 6 wherein the battery operated radiotelephone is a cellular telephone.

11. A method for limiting battery power dissipation in a battery powered radiotelephone, the battery powered radiotelephone including a keypad and a display, the method comprising the steps of:
   providing a switch responsive to grasping of the battery powered radiotelephone;
   starting a blanking timer;
   blanking the display upon expiration of the blanking timer;
   detecting a switch actuation of the switch; and
   in response to the switch actuation, un-blanking the display.

12. A method as recited in claim 11 wherein the step of blanking the display comprises the step of interrupting supply of battery power to the display and wherein the step of un-blanking the display comprises the step of establishing supply of battery power to the display.

13. A method as recited in claim 11 wherein the method further comprises the steps of:

providing an earpiece sensor, the earpiece sensor being activated when the battery powered radiotelephone is located adjacent to a user's head; and if the earpiece sensor is activated, blanking the display.

14. A radiotelephone comprising a keypad, a display, a switch closeable in response to engagement of the radiotelephone by a user's hand, and a controller coupled to the keypad and the display, the controller blanking the display a predetermined time following actuation of the keypad, the controller illuminating the display in response to closure of the switch, and the controller blanking the display in response to placing the radiotelephone in a position adjacent to a user's head.

15. A radiotelephone as recited in claim 14 wherein engagement of the radiotelephone comprises grasping of the radiotelephone so as to close the switch.

16. A radiotelephone as recited in claim 14 wherein the display comprises a plurality of light emitting diodes.

17. A radiotelephone comprising:

a housing;

a battery configured for attachment to the housing;

a display disposed within the housing;

a keypad disposed within the housing;

one or more grips disposed on the housing and configured for manual grasping by a user of the radiotelephone;

a switch responsive to grasping of the one or more grips for providing a blanking control signal;

an earpiece sensor disposed within the housing for providing an indication when the radiotelephone is located adjacent to a user's head; and a controller disposed within the housing and coupled to the battery, the display, the keypad, the switch and the earpiece sensor, the controller interrupting supply of battery power from the battery to the display after a predetermined time following actuation of the keypad and interrupting supply of battery power from the battery to the display in response to the indication, the controller maintaining supply of battery power from the battery to the controller to the display in response to the blanking control signal.

18. A radiotelephone as recited in claim 17 wherein the display comprises one or more light emitting diodes.

19. A radiotelephone as recited in claim 18 wherein at least one light emitting diode illuminated the keypad.

20. A radiotelephone as recited in claim 18 wherein the display further comprises a liquid crystal display and wherein at least one light emitting diode illuminates the liquid crystal display.

21. A radiotelephone comprising:

a housing;

a battery configured for attachment to the housing;

a keypad disposed within the housing;

a switch responsive to a user's touching of the radiotelephone for providing a blanking control signal;

an earpiece sensor disposed within the housing for providing an indication when the radiotelephone is located adjacent to the user's head; and a controller disposed within the housing, the controller interrupting supply of battery power from the battery to a portion of the radiotelephone after a predetermined time following actuation of the keypad and interrupting supply of battery power from the battery to the portion of the radiotelephone in response to the indication, the controller maintaining supply of battery power from the battery to the portion of the radiotelephone in response to the blanking control signal.

22. A radiotelephone as recited in claim 21 wherein the portion of the radiotelephone comprises a display disposed within the housing.

23. A radiotelephone as recited in claim 22 wherein the display comprises an illuminated keypad.

24. A communication device as recited in claim 21 wherein the switch comprises a grip switch responsive to the user grasping the communication device.

\* \* \* \* \*